(12) United States Patent
Poosa (10) Patent No.: US 11,200,654 B2
(45) Date of Patent: Dec. 14, 2021

(54) SYSTEM AND METHOD FOR DETERMINING FIELD CHARACTERISTICS BASED ON A DISPLAYED LIGHT PATTERN

(71) Applicant: CNH Industrial America LLC, New Holland, PA (US)

(72) Inventor: Sai Raghavendra Prasad Poosa, Pittsburgh, PA (US)

(73) Assignee: CNH Industrial America LLC, New Holland, PA (US)

( * ) Notice: Subject to any disclaimer, the term of this patent is extended or adjusted under 35 U.S.C. 154(b) by 167 days.

(21) Appl. No.: 16/540,377

(22) Filed: Aug. 14, 2019

(65) Prior Publication Data

US 2021/0049750 A1 Feb. 18, 2021

(51) Int. Cl.
```
G06T 7/00      (2017.01)
G06T 7/521     (2017.01)
H04N 5/225     (2006.01)
A01B 79/00     (2006.01)
A01B 49/02     (2006.01)
```
(52) U.S. Cl.
CPC .......... G06T 7/0002 (2013.01); A01B 79/005 (2013.01); G06T 7/521 (2017.01); H04N 5/2256 (2013.01); A01B 49/027 (2013.01); G06T 2207/30188 (2013.01)

(58) Field of Classification Search
CPC ........... G06T 7/521; G06T 2207/30188; A01B 79/005
See application file for complete search history.

(56) References Cited

U.S. PATENT DOCUMENTS

| | | | |
|---|---|---|---|
| 4,338,031 | A | 7/1982 | Miller et al. |
| 6,201,883 | B1 | 3/2001 | Mizui |
| 6,853,937 | B2 | 2/2005 | Shibusawa et al. |
| 7,508,972 | B2 | 3/2009 | Maruya |
| 8,363,210 | B2 | 1/2013 | Montgomery |

(Continued)

FOREIGN PATENT DOCUMENTS

| | | |
|---|---|---|
| JP | 2016008484 A | 1/2016 |
| WO | WO2012/102667 A1 | 8/2012 |

OTHER PUBLICATIONS

International Search Report and Written Opinion issued in corresponding to Application No. PCT/US2020/045867 dated Nov. 13, 2020 (11 pages).

*Primary Examiner* — Jeremiah C Hallenbeck-Huber
(74) *Attorney, Agent, or Firm* — Rebecca L. Henkel; Rickard K. DeMille (57) ABSTRACT

In one aspect, a system for determining field characteristics during the performance of an agricultural operation may include an imaging device configured to capture image data associated with a portion of the field within a field of view of the imaging device. The system may also include an illumination device configured to emit a light directed at the portion of the field within the field of view of the imaging device. Furthermore, a controller of the system may be configured to control an operation of the illumination device such that a light pattern is displayed on a field surface of the field. Moreover, the controller may be configured to receive image data indicative of the displayed light pattern from the imaging device. Additionally, the controller may be configured to determine a field characteristic of the field based on the displayed light pattern.

19 Claims, 5 Drawing Sheets

(56) References Cited

U.S. PATENT DOCUMENTS

| | | | |
|---|---|---|---|
| 9,158,980 B1* | 10/2015 | Ferguson | G08G 1/096725 |
| 9,554,098 B2* | 1/2017 | Casper | A01B 63/28 |
| 10,123,475 B2* | 11/2018 | Posselius | A01B 63/1112 |
| 10,190,288 B2 | 1/2019 | Matson et al. | |
| 10,834,798 B1* | 11/2020 | Hunt | A01D 41/12 |
| 2005/0088643 A1* | 4/2005 | Anderson | A01D 34/001 |
| | | | 356/5.01 |
| 2017/0107698 A1 | 4/2017 | Yamaguchi et al. | |
| 2017/0112042 A1 | 4/2017 | Yi et al. | |
| 2017/0261315 A1* | 9/2017 | Yamaguchi | G08G 1/16 |
| 2017/0322624 A1 | 11/2017 | Niccolini et al. | |
| 2018/0000011 A1* | 1/2018 | Schleusner | G06T 7/0004 |
| 2018/0220577 A1* | 8/2018 | Posselius | A01B 79/005 |
| 2019/0003136 A1* | 1/2019 | Kimura | B60Q 1/04 |
| 2019/0071841 A1 | 3/2019 | Elkins | |

* cited by examiner

SYSTEM AND METHOD FOR DETERMINING FIELD CHARACTERISTICS BASED ON A DISPLAYED LIGHT PATTERN

FIELD OF THE INVENTION

The present disclosure generally relates to agricultural machines and, more particularly, to systems and methods for determining field characteristics during the performance of an agricultural operation based on a light pattern displayed on the surface of the field.

BACKGROUND OF THE INVENTION

Tillage implements, such as cultivators, disc harrows, and/or the like, perform one or more tillage operations while being towed across a field by a suitable work vehicle, such as in agricultural tractor. In this regard, tillage implements often include one or more sensors mounted thereon to monitor various characteristics associated with the performance of such tillage operations. For example, some tillage implements include one or more imaging devices (e.g., cameras) that capture image data associated with the surface of the field. Thereafter, the image data may be processed or analyzed to determine one or more field characteristics, such as clod size, soil roughness, residue coverage, and/or the like. While systems and methods that determine field characteristics based on captured image data can provide accurate results, further improvements are needed.

Accordingly, an improved system and method for determining field characteristics during the performance of an agricultural operation would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to a system for determining field characteristics during the performance of an agricultural operation. The system may include an agricultural machine configured to perform an agricultural operation on a field across which the agricultural machine is traveling. The system may further include an imaging device provided in operative association with the agricultural machine, with the imaging device configured to capture image data associated with a portion of the field within a field of view of the imaging device. Furthermore, the system may include an illumination device provided in operative association with the agricultural machine, with the illumination device configured to emit a light directed at the portion of the field within the field of view of the imaging device. Additionally, the system may include a controller communicatively coupled to the imaging device and the illumination device. As such, the controller may be configured to control an operation of the illumination device such that a light pattern is displayed on a field surface of the field. Moreover, the controller may be configured to receive image data indicative of the displayed light pattern from the imaging device. In addition, the controller may be configured to determine a field characteristic of the field based on the displayed light pattern.

In another aspect, the present subject matter is directed to a method for determining field characteristics during the performance of an agricultural operation by an agricultural machine. The agricultural machine may include an imaging device configured to capture image data associated with a portion of a field within a field of view of the imaging device. The method may include controlling, with one or more computing devices, an operation of an illumination device such that a light pattern is displayed on a field surface of the portion of the field within the field of view of the imaging device. Furthermore, the method may include receiving, with the one or more computing devices, image data indicative of the displayed light pattern from the imaging device as the agricultural machine travels across the field. Additionally, the method may include determining, with the one or more computing devices, a field characteristic of the field based on the displayed light pattern.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for determining field characteristics during the performance of an agricultural operation. Specifically, in several embodiments, the system may include an imaging device (e.g., a camera) provided in operative association with an agricultural machine performing the agricultural operation. The imaging device may, in turn, be configured to capture image data associated with a portion of the field within a field of view of the imaging device. Furthermore, the system may include an illumination device (e.g., a laser-emitting device) configured to emit light directed at the portion of the field within the field of view of the imaging device. Such emitted light may result in a light pattern (e.g., a plurality of lines forming a grid) being displayed on the surface of the field.

In accordance with aspects of the present subject matter, a controller of the disclosed system may be configured to determine one or more characteristics (e.g., residue coverage, clod size, and/or soil roughness) of the field based on the displayed light pattern. Specifically, the field surface may cause the displayed light pattern to distort, with such distortion being indicative of the characteristic(s) of the field. As such, the controller may be configured to receive image data indicative of the displayed light pattern from the imaging device as the agricultural machine travels across the field. Thereafter, the controller may be configured to determine the field characteristic(s) based on the distortion of the displayed light pattern. For example, in one embodiment, the controller may be configured to determine the distortion of the displayed light pattern by comparing the received image data to a reference image associated with the displayed light pattern. In one embodiment, the controller may be configured to adjust one or more operating parameters (e.g., of the ground speed and/or the force(s) being applied to a ground-engaging tool(s)) of the agricultural machine based on the determined field characteristic(s).

Figure 1:
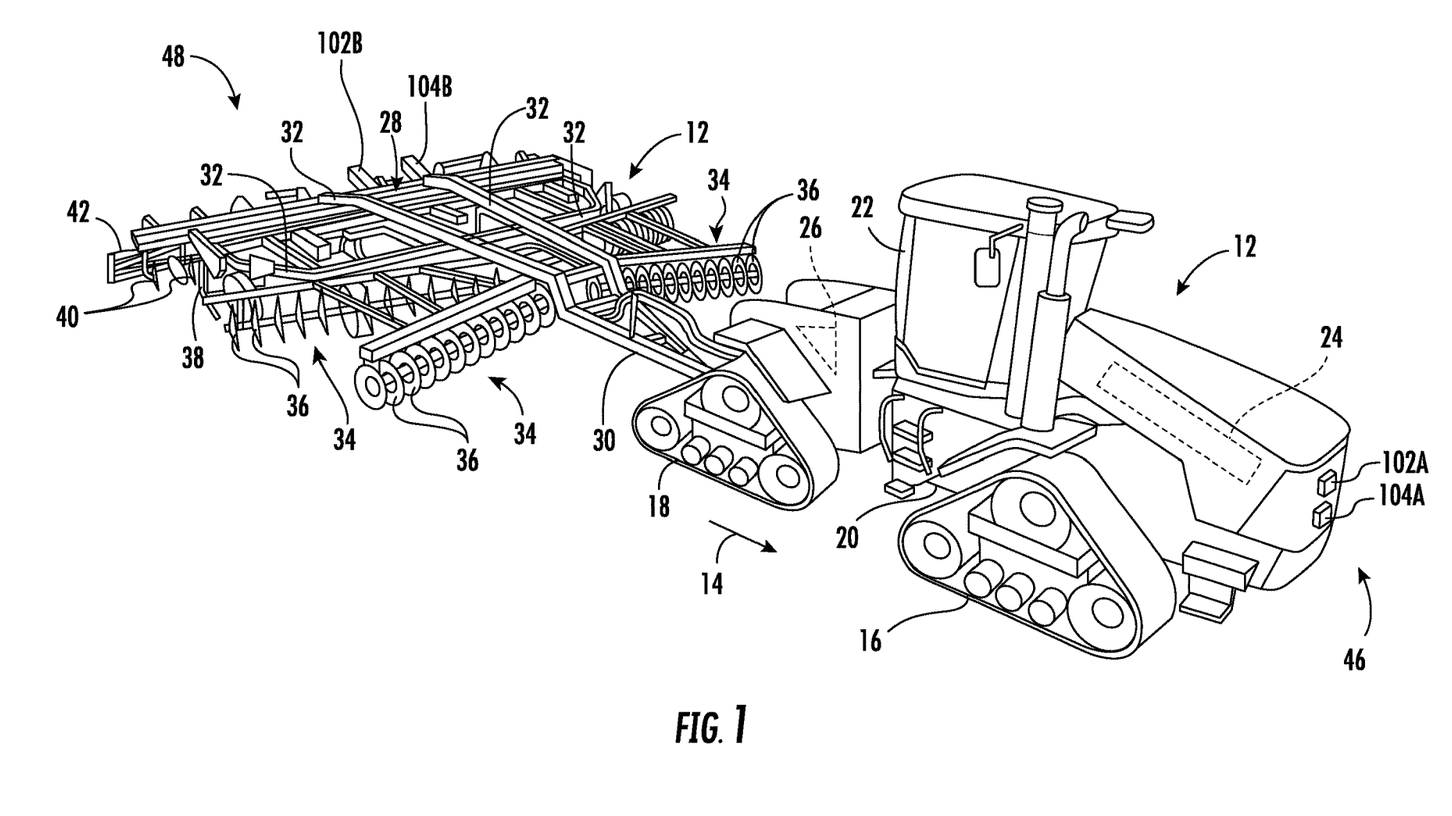
FIG. 1 illustrates a perspective view of one embodiment of an agricultural machine in accordance with aspects of the present subject matter.

Referring now to the drawings, FIG. 1 illustrates a perspective view of one embodiment of an agricultural machine in accordance with aspects of the present subject matter. As shown, in the illustrated embodiment, the agricultural machine corresponds to a work vehicle 10 and an associated agricultural implement 12. In general, the work vehicle 10 may be configured to tow the implement 12 across a field in a direction of travel (e.g., as indicated by arrow 14 in FIG. 1). As such, in one embodiment, the work vehicle 10 may be configured as an agricultural tractor and the implement 12 may be configured as a tillage implement. However, in other embodiments, the work vehicle 10 may be configured as any other suitable type of vehicle, such as an agricultural harvester, a self-propelled sprayer, and/or the like. Similarly, the implement 12 may be configured as any other suitable type of implement, such as a planter. Furthermore, it should be appreciated that the agricultural machine may correspond to any suitable powered and/or unpowered agricultural machine (including suitable vehicles and/or equipment, such as only a work vehicle or only an implement). Additionally, the agricultural machine may include more than two machines (e.g., a tractor, a planter, and an associated air cart) coupled to a work vehicle.

As shown in FIG. 1, the work vehicle 10 may include a pair of front track assemblies 16, a pair or rear track assemblies 18, and a frame or chassis 20 coupled to and supported by the track assemblies 16, 18. An operator's cab 22 may be supported by a portion of the chassis 20 and may house various input devices (e.g., a user interface) for permitting an operator to control the operation of one or more components of the work vehicle 10 and/or one or more components of the implement 12. Additionally, the work vehicle 10 may include an engine 24 and a transmission 26 mounted on the chassis 20. The transmission 26 may be operably coupled to the engine 24 and may provide variably adjusted gear ratios for transferring engine power to the track assemblies 16, 18 via a drive axle assembly (not shown) (or via axles if multiple drive axles are employed).

Additionally, as shown in FIG. 1, the implement 12 may generally include a frame 28 configured to be towed by the vehicle 10 via a pull hitch or tow bar 30 in the direction of travel 14. In general, the frame 28 may include a plurality of structural frame members 32, such as beams, bars, and/or the like, configured to support or couple to a plurality of components. As such, the frame 28 may be configured to support a plurality of ground-engaging tools, such as a plurality of shanks, disk blades, leveling blades, basket assemblies, tines, spikes, and/or the like. In one embodiment, the various ground-engaging tools may be configured to perform a tillage operation or any other suitable ground-engaging operation on the field across which the implement 12 is being towed. For example, in the illustrated embodiment, the frame 28 is configured to support various gangs 34 of disc blades 36, a plurality of ground-engaging shanks 38, a plurality of leveling blades 40, and a plurality of crumbler wheels or basket assemblies 42. Moreover, as will be described below, the implement 12 may include one or more tool actuators 44 (FIG. 3), with each tool actuator 44 configured to adjust the position of and/or the force being applied to one of the ground-engaging tools. However, in alternative embodiments, the frame 28 may be configured to support any other suitable ground-engaging tool(s) or combinations of ground-engaging tools.

Furthermore, the vehicle/implement 10/12 may include one or more imaging devices coupled thereto and/or mounted thereon. In general, each imaging device may be configured to capture image data (e.g., images) associated with a portion of the field across which the vehicle/implement 10/12 is traveling. As will be described below, the captured image data may, in turn, be used to estimate or determine one or more characteristics of the field, such as residue coverage, surface roughness, clod size, and/or the like. As such, in several embodiments, the imaging device(s) may be provided in operative association with the vehicle/implement 10/12 such that the device(s) has an associated field(s) of view or sensor detection range(s) directed towards a portion(s) of the field adjacent to the vehicle/implement 10/12. For example, as shown in FIG. 1, in one embodiment, one imaging device 102A may be mounted on a forward end 46 of the work vehicle 10 to capture image data associated with a section of the field disposed in front of the vehicle 10 relative to the direction of travel 14. Similarly, as shown in FIG. 1, a second imaging device 102B may be mounted on an aft end 48 of the implement 12 to capture image data associated with a section of the field disposed behind the implement 12 relative to the direction of travel 14. However, in alternative embodiments, the imaging devices 102A, 102B may be installed at any other suitable location(s) on the vehicle/implement 10/12. Additionally, in some embodiments, the vehicle/implement 10/12 may include only one imaging or three or more imaging devices.

In accordance with aspects of the present subject matter, the vehicle/implement 10/12 may include one or more illumination devices coupled thereto and/or mounted thereon. In general, each illumination device may be configured to emit a light directed at the portion of the field within the field of view of an associated imaging device. In this regard, the emitted light may result in a light pattern being displayed on the surface the portion of the field within the field of view of the associated imaging device. As will be described below, the displayed light pattern(s) may be indicative of the characteristic(s) (e.g., residue coverage, surface roughness, and/or clod size). In several embodiments, the illumination device(s) may be provided in operative association with the vehicle/implement 10/12 such that the device(s) emits a light into the field of view of the corresponding imaging device. For example, as shown in FIG. 1, in one embodiment, one illumination device 104A may be mounted on the forward end 46 of the work vehicle 10 to emit a light into the field of view of the imaging device 102A. Similarly, as shown in FIG. 1, a second illumination device 104B may be mounted on the aft end 48 of the implement 12 to emit a light into the field of view of the imaging device 102B. However, in alternative embodiments, the illumination devices 104A, 104B may be installed at any other suitable location(s) on the vehicle/implement 10/12. Additionally, in some embodiments, the vehicle/implement 10/12 may include only one illumination device or three or more illumination devices.

Figure 2:
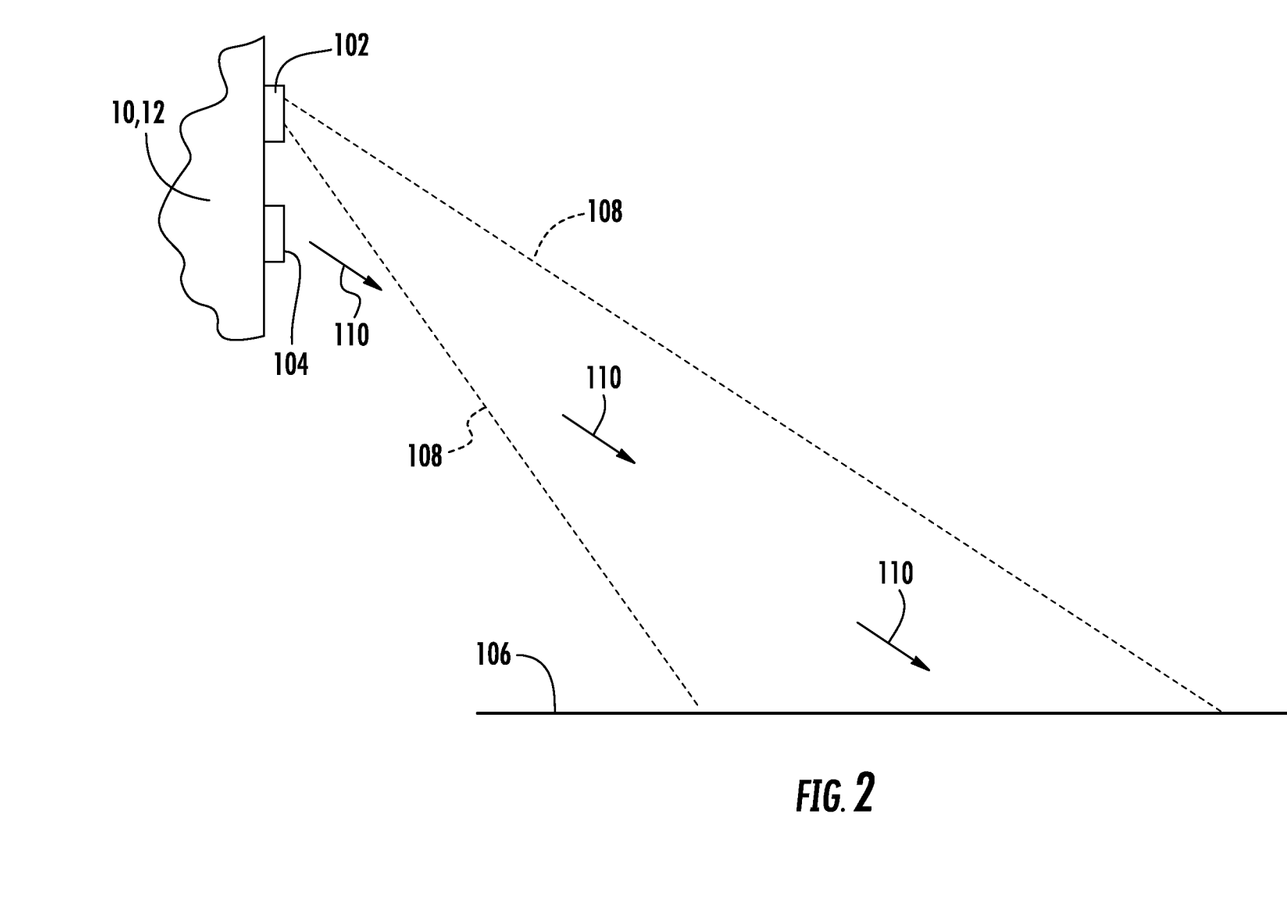
FIG. 2 illustrates a side view of one embodiment of an imaging device and an illumination device of an agricultural machine in accordance with aspects of the present subject matter.

Referring now to FIG. 2, one embodiment of an imaging device 102 and an illumination device 104 of the vehicle/implement 10/12 is illustrated in accordance with aspects of the present subject matter. Specifically, in several embodiments, the imaging device 102 may be configured as a suitable camera(s). In such embodiments, as the vehicle/implement 10/12 travels across the field, the imaging device 102 may be configured to capture image data (e.g., images) of a surface 106 of the field present within its field of view (e.g., as indicated by dashed lines 108 in FIG. 2). For instance, in one embodiment, the imaging device 102 may correspond to a stereographic camera(s) having two or more lenses with a separate image sensor for each lens to allow the camera(s) to capture stereographic or three-dimensional images. As will be described below, the image data captured by the imaging device 102 may be used in determining one or more characteristics of the field, such as residue coverage, surface roughness, clod size, and/or the like. However, in alternative embodiments, the imaging device 102 may correspond to any other suitable sensing device(s) configured to capture image data, such as a monocular camera.

Additionally, the illumination device 104 may be configured to display a light pattern on the surface 106 of the field. Specifically, as the vehicle/implement 10/12 travels across the field, the illumination device 104 may be configured to emit light (e.g., as indicated by arrows 110 in FIG. 2) directed at the portion of the field within the field of view 108 of the imaging device 102. The emitted light may, in turn, cause the light pattern to be displayed on the surface 106 of the portion of the field present within the field of view 108 of the imaging device 102. As will be described below, the field surface 106 may distort the displayed light pattern(s), with such distortion(s) being indicative of the field characteristic(s) (e.g., residue coverage, surface roughness, and/or clod size). As such, the image data captured by the imaging device 102 may depict or otherwise be indicative of the distortion of displayed light pattern by the field surface. In this regard, a controller may be configured to analyze the captured image data and determine the field characteristic(s) based on the distortions of the displayed light pattern depicted within such data.

It should be appreciated that the illumination device 104 may be configured as any suitable device(s) configured to emit a light such that a light pattern is displayed on the field surface 106. For example, in one embodiment, the illumination device 104 may be configured as a laser-emitting device, such as a laser diode. However, in alternative embodiments, the illumination device 104 may be configured as any other suitable light-emitting device(s).

Moreover, it should be further appreciated that the configuration of the work vehicle 10 and the agricultural implement 12 described above and shown in FIGS. 1 and 2 is provided only to place the present subject matter in an exemplary field of use. Thus, it should be appreciated that the present subject matter may be readily adaptable to any manner of agricultural machine configuration.

Figure 3:
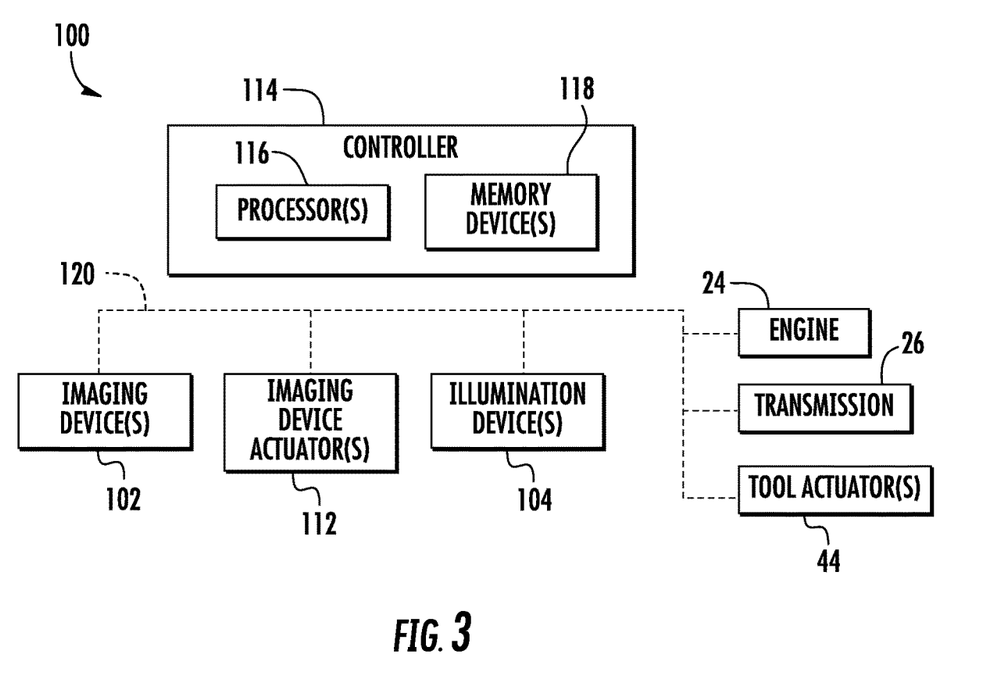
FIG. 3 illustrates a schematic view of one embodiment of a system for determining field characteristics during the performance of an agricultural operation in accordance with aspects of the present subject matter.

Referring now to FIG. 3, a schematic view of one embodiment of a system 100 for determining field characteristics during the performance of an agricultural operation is illustrated in accordance with aspects of the present subject matter. In general, the system 100 will be described herein with reference to the work vehicle 10 and the agricultural implement 12 described above with reference to FIGS. 1 and 2. However, it should be appreciated by those of ordinary skill in the art that the disclosed system 100 may generally be utilized with agricultural machines having any other suitable machine configuration.

As shown in FIG. 3, the system 100 may include the tool actuator(s) 44 of the implement 12. Specifically, each actuator 44 may be configured to adjust to the position or orientation of a ground-engaging tool of implement 12 (e.g., one of the gangs of disc blades 36, the shanks 38, the leveling blades 40, or the basket assemblies 42) relative to the implement frame 28. For example, in one embodiment, a first end of each actuator 44 (e.g., a rod of each actuator 44) may be coupled to the tool, while a second end of each actuator 44 (e.g., the cylinder of each actuator 44) may be coupled to the frame 28. The rod of each actuator 44 may be configured to extend and/or retract relative to the corresponding cylinder to adjust the position or orientation of the tool relative to the frame 28. In one embodiment, the actuator(s) 44 corresponds to a fluid-driven actuator(s), such as a hydraulic or pneumatic cylinder(s). However, in alternative embodiments, the actuator(s) 44 may correspond to any other suitable type of actuator(s), such as an electric linear actuator(s).

Furthermore, the system 100 may include one or more imaging device actuators 112. Specifically, each actuator 112 may be configured to adjust to the position and/or orientation of an imaging device 102 of vehicle/implement 10/12 relative to corresponding illumination device 104. In this regard, and as will be described below, the actuator(s) 112 may allow the imaging device(s) 102 is to capture image data associated with the displayed light pattern(s) from differing positions and/or orientations. In one embodiment, a first end of each actuator 112 (e.g., a rod of each actuator 112) may be coupled to the imaging device 102, while a second end of each actuator 112 (e.g., the cylinder of each actuator 112) may be coupled to the chassis 20 of the vehicle 10 or the frame 28 of the implement 12. The rod of each actuator 112 may be configured to extend and/or retract relative to the corresponding cylinder to adjust the position or orientation of the imaging device 102 relative to the chassis/frame 20/28. In one embodiment, the actuator(s) 112 corresponds to a fluid-driven actuator(s), such as a hydraulic or pneumatic cylinder(s). However, in alternative embodiments, the actuator(s) 112 may correspond to any other suitable type of actuator(s), such as an electric linear actuator(s).

In accordance with aspects of the present subject matter, the system 100 may include a controller 114 positioned on and/or within or otherwise associated with the vehicle 10 or the implement 12. In general, the controller 114 may comprise any suitable processor-based device known in the art, such as a computing device or any suitable combination of computing devices. Thus, in several embodiments, the controller 114 may include one or more processor(s) 116 and associated memory device(s) 116 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 118 of the controller 114 may generally comprise memory element(s) including, but not limited to, a computer readable medium (e.g., random access memory (RAM)), a computer readable non-volatile medium (e.g., a flash memory), a floppy disc, a compact disc-read only memory (CD-ROM), a magneto-optical disc (MOD), a digital versatile disc (DVD), and/or other suitable memory elements. Such memory device(s) 118 may generally be configured to store suitable computer-readable instructions that, when implemented by the processor(s) 116, configure the controller 114 to perform various computer-implemented functions.

In addition, the controller 114 may also include various other suitable components, such as a communications circuit or module, a network interface, one or more input/output channels, a data/control bus and/or the like, to allow controller 114 to be communicatively coupled to any of the various other system components described herein (e.g., the engine 24, the transmission 26, the tool actuator(s) 44, the imaging device(s) 102, the illumination device(s) 104, imaging device actuator(s) 112). For instance, as shown in FIG. 3, a communicative link or interface 120 (e.g., a data bus) may be provided between the controller 114 and the components 24, 26, 44, 102, 104, 112 to allow the controller 114 to communicate with such components 24, 26, 44, 102, 104, 112 via any suitable communications protocol (e.g., CAN-BUS).

It should be appreciated that the controller 114 may correspond to an existing controller(s) of the vehicle 10 and/or the implement 12, itself, or the controller 114 may correspond to a separate processing device. For instance, in one embodiment, the controller 114 may form all or part of a separate plug-in module that may be installed in association with the vehicle 10 and/or the implement 12 to allow for the disclosed systems to be implemented without requiring additional software to be uploaded onto existing control devices of the vehicle 10 and/or the implement 12. It should also be appreciated that the functions of the controller 114 may be performed by a single processor-based device or may be distributed across any number of processor-based devices, in which instance such devices may be considered to form part of the controller 114. For instance, the functions of the controller 108 may be distributed across multiple application-specific controllers, such as an engine controller, a transmission controller, an implement controller, and/or the like.

In several embodiments, the controller 114 may be configured to control the operation of one or more illumination devices 104 such that a light pattern(s) is displayed on a surface of the field. As described above, the vehicle 10 and/or the implement 12 may include one or more illumination devices 104, with each illumination device 104 configured to emit light into the field of view 108 of an associated imaging device 102. Such emitted light may, in turn, cause a light pattern to be displayed on the surface of a portion of the field positioned within the field of view 108 of the associated imaging device 102. As will be described below, the field surface may distort the displayed light pattern, with such distortion being indicative of one or more field characteristics. In this regard, as the vehicle/implement 10/12 travels across the field to perform an agricultural operation thereon (e.g., a tillage operation), the controller 114 may be configured to transmit instructions to the illumination device(s) 104 (e.g., via the communicative link 120). The instructions may, in turn, instruct each illumination device 104 to emit a light such that a light pattern is displayed on the surface of the field within the field of view 108 of the associated imaging device 102.

Figure 4:
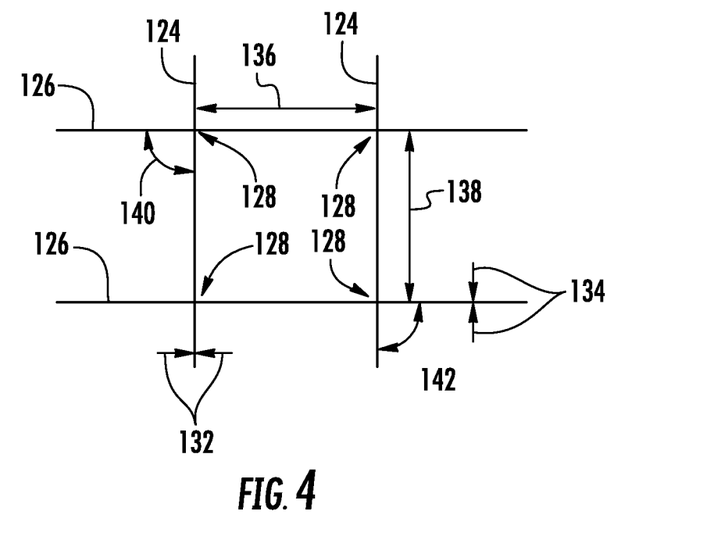
FIG. 4 illustrates an example view of one embodiment of a light pattern being displayed by an illumination device of an agricultural machine in accordance with aspects of the present subject matter.

Referring now to FIG. 4, an example view of one embodiment of a light pattern 122 being displayed by an illumination device 104 in accordance with aspects of the present subject matter. As shown, the displayed light pattern 122 may include a plurality of lines 124, 126 forming a grid. Specifically, in one embodiment, the displayed light pattern 122 may include a pair of spaced apart longitudinally-extending first lines 124 and a pair of spaced apart laterally-extending second lines 126. Each of the first lines 124 may intersect each of the second lines 126 at a corresponding intersection 128 such that a grid is formed. Furthermore, the displayed light pattern 122 may have one or more pattern parameters associated therewith. For example, such pattern parameters may include thicknesses (e.g., as indicated by arrows 132, 134 in FIG. 4) of the lines 124, 126, respectively; distances (e.g., as indicated by arrows 136, 138 in FIG. 4) between pairs of the lines 124, 126, respectively; and angles (e.g., as indicated by arrows 140, 142 in FIG. 4) defined by intersecting pairs of lines 124, 126. As will be described below, the residue and/or soil clods present on and/or the surface roughness of the field surface on which the light pattern 122 is displayed may distort grid and/or pattern parameters of the light pattern 122. Such distortion may, in turn, be indicative of the residue coverage, clod size, surface roughness, and/or other field parameters. However, in alternative embodiments, the displayed light pattern 122 may have any other suitable shape or configuration, including non-grid-like or non-line-based shapes. For example, in one embodiment, the displayed light pattern may be a solid or filled-in shape, such as a triangle, circle, rectangle, star, and/or the like.

Referring again to FIG. 3, the controller 114 may be configured to receive image data indicative of the displayed light pattern(s) from the imaging device(s) 102. As described above, the vehicle/implement 10/12 may include one or more imaging devices 102 (e.g., a camera(s)), with each imaging device 102 configured to capture image data indicative of a light pattern being displayed on a portion of the field positioned within its field of view 108. In this regard, as the vehicle/implement 10/12 travels across the field to perform the agricultural operation, the controller 114 may be configured to receive the image data from the imaging device(s) 102 (e.g., via the communicative link 120). As will be described below, the controller 114 may be configured to determine one or more field parameters based on the received image data.

In several embodiments, the controller 114 may be configured to adjust the intensity or brightness of the displayed light pattern(s). As indicated above, the imaging device(s) 102 may be configured to capture image data that is indicative of the displayed light pattern(s). In this regard, the lighting conditions of the field(s) of view 108 of the imaging device(s) 102 may affect the quality of the captured image data. For example, when the field(s) of view 108 of the imaging device(s) 102 are in direct sunlight, such sunlight may obscure the displayed light pattern(s) depicted in the captured image data. Conversely, when the field(s) of view 108 of the imaging device(s) 102 are in low light conditions, the displayed light pattern(s) may be too bright such that the light pattern(s) depicted in the captured image data is flared. As such, the controller 114 may be configured to receive an input(s) associated with the lighting conditions of the field(s) of view 108 of the imaging device(s) 102. Such input(s) may be received from an operator of the vehicle/implement 10/12 via a user interface (not shown) or from an ambient light sensor (not shown). Thereafter, the controller 114 may be configured to transmit instructions to the illumination device(s) 104 (e.g., via the communicative link 120). The instructions may, in turn, instruct each illumination device 104 to adjust the intensity or brightness of the emitted light based on the received input(s).

Moreover, in one embodiment, the controller 114 may be configured to initiate an adjustment(s) of the positioning of the imaging device(s) 102 relative to the associated displayed light pattern. As described above, vehicle/implement 10/12 may include one or more imaging device actuators 112, with each imaging device actuator 112 being configured to adjust the position and/or orientation of one of the imaging devices 102 relative to the associated displayed light pattern. As such, in addition to and/or in lieu of adjusting the intensity/brightness of the displayed light pattern(s) to mitigate the effects of the lighting conditions on the captured image data, the controller 114 may be configured to initiate one or more adjustments of the positioning and/or orientation of the imaging device(s) 102. For example, when the image sensor(s) (not shown) of the imaging device(s) 102 are in direct sunlight, the controller 114 may be configured to initiate adjustment(s) of the position(s) and/or orientation(s) of the imaging device(s) 102 such that the image sensor(s) are no longer positioned in direct sunlight. In this regard, the controller 114 may be configured to transmit instructions to the imaging device actuator(s) 112 (e.g., via the communicative link 120). The instructions may, in turn, instruct each imaging device actuator 112 to adjust the position and/or orientation of the corresponding imaging device 102.

Figure 5:
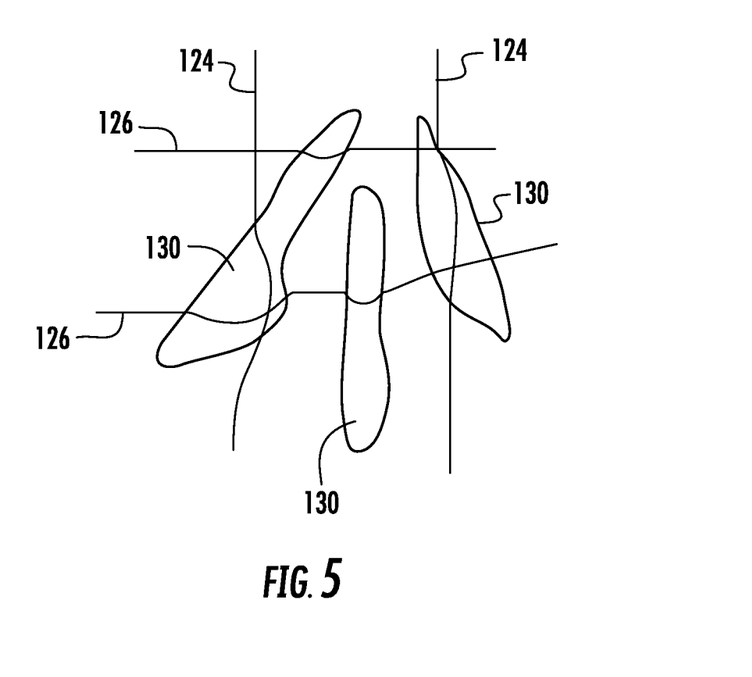
FIG. 5 illustrates an example view of the distortion of the displayed light pattern shown in FIG. 4 by a field surface in accordance with aspects of the present subject matter.

In accordance with aspects of the present subject matter, the controller 114 may be configured to determine one or more characteristics of the field across which the vehicle/implement 10/12 is traveling based on the displayed light pattern(s). Such field characteristics may include residue characteristics (e.g., residue coverage and/or presence of residue bunches), soil clod size, surface roughness, and/or the like. More specifically, residue and/or soil clods present on and/or the surface roughness of the field surface may distort the displayed light pattern(s). For example, as shown in FIG. 5, the residue pieces 130 may cause the lines 124, 126 of the displayed light pattern 122 to bend or otherwise distort. As such, the distortion(s) of the displayed light pattern(s) may, in turn, be indicative of the residue coverage, clod size, surface roughness, and/or other field parameters. In this regard, the controller 114 may be configured to process/analyze the received image data to determine or estimate the characteristic(s) of the field at the current location of the vehicle/implement 10/12 based on the distortion(s) of the displayed light pattern(s). In this regard, the controller 114 may include one or more algorithms stored within its memory device(s) 118 that, when executed by the processor(s) 116, that configure the controller 114 to determine the field characteristic(s) based on distortion(s) of the displayed light pattern(s) depicted in the received image data.

In several embodiments, the controller 114 may be configured to determine the field parameter(s) by comparing the distortion(s) of the light pattern(s) to a reference image. In general, the displayed light pattern(s) may have a predetermined shape or configuration. For example, as described above with reference to FIG. 4, in one embodiment, the displayed light pattern(s) may have a plurality of lines forming a grid. As such, the controller 114 may be configured to compare the distortion(s) of the light pattern(s) depicted in the received image data to a reference image associated with the predetermined or undistorted shape/configuration of the displayed light pattern(s). The amount and/or nature by which the distorted light pattern(s) differ from the reference image may, in turn, be indicative of the field characteristic(s). For example, larger soil clods may cause the displayed light pattern(s) to distort more than smaller soil clods such that a larger distortion of the light pattern(s) may be indicative of larger soil clods. Thereafter, the controller 114 may be configured to determine the field parameter(s) based on the comparison of the distortion(s) of the light pattern(s) to a reference image. In this regard, the controller 114 may include one or more algorithms stored within its memory device(s) 118 that, when executed by the processor(s) 116, that configure the controller 114 to compare the distortion(s) of the light pattern(s) depicted by the received image data and determine the field characteristic(s) based on such comparison(s).

Furthermore, in several embodiments, the controller 114 may be configured to determine the field parameter(s) based on the one or more pattern parameters of the displayed light pattern(s). As indicated above, the displayed light pattern(s) may have one or more pattern parameter values associated therewith. Such pattern parameters may include the thickness of a line(s) of the light pattern(s), the distance(s) between lines of the light pattern(s), the angle(s) defined between intersecting lines of the light pattern(s), and/or the like. In general, the pattern parameter value(s) of the distorted light pattern(s) may differ from the predetermined pattern parameter value(s). Specifically, the amount(s) by which the parameter value(s) of the distorted light pattern(s) differ from the associated predetermined value(s) may be indicative of the field characteristic(s). For example, as mentioned above, larger soil clods may cause the displayed light pattern(s) to distort more than the smaller soil clods. As such, larger soil clods may cause the distance(s) between the lines to differ more from the associated predetermined value(s) than smaller soil clods. In this regard, the controller 114 may be configured to analyze/process the received image data to determine or estimate one or more pattern parameter values associated with the distortion(s) of the light pattern(s) depicted by the data. Moreover, the controller 114 may be configured to determine the distortion(s) of the displayed light pattern(s) by comparing the determined pattern parameter value(s) to the associated predetermined value(s) to determine a differential(s) therebetween. Thereafter, the controller 114 may be configured to determine the field characteristic(s) based on the determined distortion(s).

Additionally, in several embodiments, the controller 114 may be configured to adjust one or more operating parameters of the vehicle 10 and/or implement 12 based on the determined field characteristic(s). Specifically, the controller 114 may be configured to automatically adjust one or more operating parameters of the vehicle 10 and/or implement 12 when it is determined that the field parameter(s) has fallen outside of a predetermined field parameter range. Specifically, in one embodiment, the controller 114 may be configured to initiate adjustment of the force applied to and/or the penetration depth(s) of one or more ground-engaging tools (e.g., the disc blades 36, the shanks 38, the leveling blades 40, and/or basket assemblies 42) of the implement 12. For example, the controller 114 may be configured transmit instructions to the tool actuator(s) 44 (e.g., via the communicative link 120) instructing the actuator(s) 44 to adjust the force applied to and/or the penetration depth(s) of associated ground engaging tool(s).

Furthermore, in one embodiment, the controller 114 may be configured to automatically adjust the ground speed at which the vehicle/implement 10/12 is traveling across the field when it is determined that the field parameter(s) has fallen outside of a predetermined field parameter range. Specifically, the controller 114 may be configured to transmit instructions to the engine 24 and/or the transmission 26 (e.g., via the communicative link 120) instructing the engine 24 and/or the transmission 26 to adjust their operation. For example, the controller 114 may instruct the engine 24 to vary its power output and/or the transmission 26 to upshift or downshift to increase or decrease the ground speed of the vehicle/implement 10/12 in a manner that adjusts the field parameter(s). However, in alternative embodiments, the controller 114 may be configured to transmit instructions to any other suitable components (e.g., braking actuators) of the vehicle 10 and/or the implement 12 such that the ground speed of the vehicle/implement 10/12 is adjusted. Furthermore, it should be appreciated that any other suitable parameter(s) the vehicle 10 and/or the implement 12 may be adjusted when it is determined that the field parameter(s) has fallen outside of a predetermined field parameter range.

Figure 6:
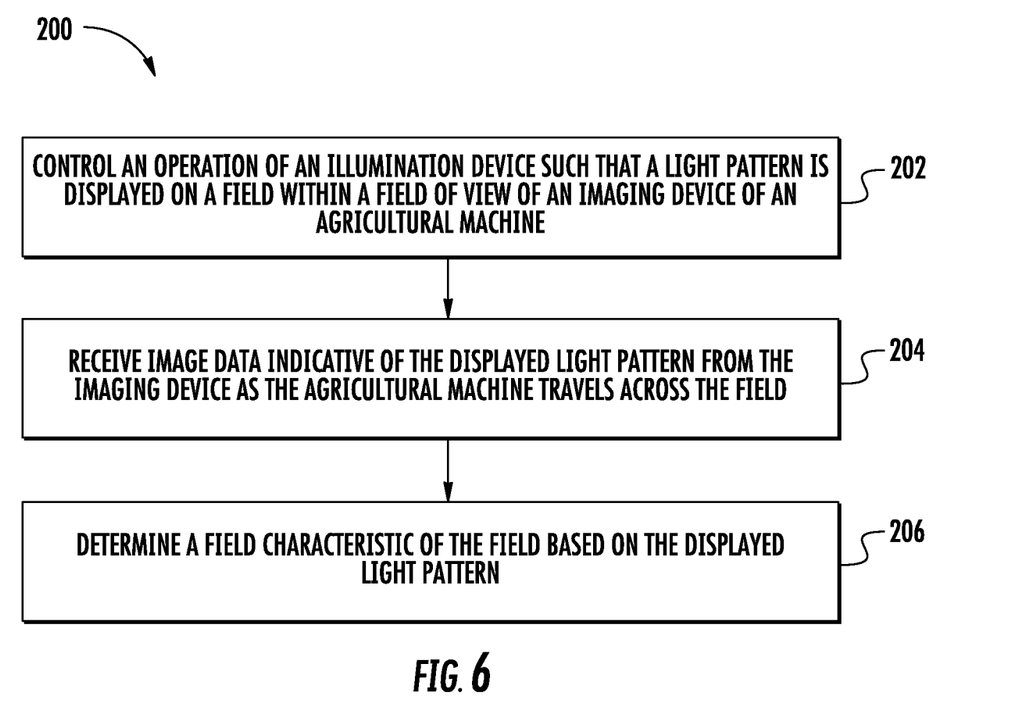
FIG. 6 illustrates a flow diagram of one embodiment of a method for determining field characteristics during the performance of an agricultural operation in accordance with aspects of the present subject matter.

Referring now to FIG. 6, a flow diagram of one embodiment of a method 200 for determining field characteristics during the performance of an agricultural operation is illustrated in accordance with aspects of the present subject matter. In general, the method 200 will be described herein with reference to the vehicle 10, the implement 12, and the system 100 described above with reference to FIGS. 1-5. However, it should be appreciated by those of ordinary skill in the art that the disclosed method 200 may generally be implemented with any agricultural machine having any suitable machine configuration and/or any system having any suitable system configuration. In addition, although FIG. 6 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 6, at (202), the method 200 may include controlling, with one or more computing devices, an operation of an illumination device such that a light pattern is displayed on a field surface of a portion of a field within a field of view of an imaging device of an agricultural machine. For instance, as described above, the controller 114 may be configured to control the operation of an illumination device 102 coupled to or mounted on a work vehicle 10 or an implement 12 such that a light pattern is displayed on a field surface of a portion of a field within a field of view 108 of an imaging device 12 of the work vehicle/implement 10/12.

Additionally, at (204), the method 200 may include receiving, with the one or more computing devices, image data indicative of the displayed light pattern from the imaging device as the agricultural machine travels across the field. For instance, as described above, the controller 114 may be configured to receive image data indicative of the displayed light pattern from the imaging device 102 as the vehicle/implement 10/12 travels across the field.

Moreover, as shown in FIG. 6, at (206), the method 200 may include determining, with the one or more computing devices, a field characteristic of the field based on the displayed light pattern. For instance, as described above, the controller 114 may be configured to determine one or more characteristics of the field based on the displayed light pattern.

It is to be understood that the steps of the method 200 are performed by the controller 114 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 114 described herein, such as the method 200, is implemented in software code or instructions which are tangibly stored on a tangible computer readable medium. The controller 114 loads the software code or instructions via a direct interface with the computer readable medium or via a wired and/or wireless network. Upon loading and executing such software code or instructions by the controller 114, the controller 114 may perform any of the functionality of the controller 114 described herein, including any steps of the method 200 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. A system for determining field characteristics during the performance of an agricultural operation, the system comprising:
an agricultural machine configured to perform an agricultural operation on a field across which the agricultural machine is traveling;
an imaging device provided in operative association with the agricultural machine, the imaging device configured to capture image data associated with a portion of the field within a field of view of the imaging device;
an illumination device provided in operative association with the agricultural machine, the illumination device configured to emit a light directed at the portion of the field within the field of view of the imaging device; and
a controller communicatively coupled to the imaging device and the illumination device, the controller configured to:
control an operation of the illumination device such that a light pattern is displayed on a field surface of the field;
receive image data indicative of the displayed light pattern from the imaging device;
determine a distortion of the displayed light pattern based on the received image data; and
determine at least one of a residue characteristic, a clod size, or a soil roughness of the field based on the determined distortion of the displayed light pattern.

2. The system of claim 1, wherein the controller further configured to:
compare the received image data to a reference image associated with the displayed light pattern; and
determine the distortion of the displayed light pattern based on the comparison of the received image data and the reference image.

3. The system of claim 1, wherein the controller is further configured to:
determine a pattern parameter of the displayed light pattern based on the received image data;
determine a differential between the determined pattern parameter and a predetermined pattern parameter value associated with the displayed light pattern; and
determine the distortion of the displayed light pattern based on the determined differential.

4. The system of claim 3, wherein the light pattern comprises a plurality of lines and the pattern parameter comprises at least one of a thickness of a line of the of the plurality of lines or a distance between a pair of lines of the plurality of lines.

5. The system of claim 3, wherein the light pattern comprises a first line and a second line intersecting the first line, the pattern parameter comprising an angle defined between the first line and the second line.

6. The system of claim 1, wherein the light pattern comprises a plurality of lines arranged in a grid.

7. The system of claim 1, wherein the controller is further configured to control the operation of the illumination device to adjust an intensity of the emitted light based on an environmental characteristic of the field.

8. The system of claim 1, further comprising:
an actuator configured to adjust a position of the imaging device relative to the displayed light pattern.

9. The system of claim 1, wherein the controller is further configured to adjust an operating parameter of the agricultural machine based on the determined at least one of the residue characteristic, the clod size, or the soil roughness.

10. The system of claim 1, wherein the controller is further configured to determine the residue characteristic of the field based on the distortion of the displayed light pattern.

11. A method for determining field characteristics dining the performance of an agricultural operation by an agricultural machine, the agricultural machine comprising an imaging device configured to capture image data associated with a portion of a field within a field of view of the imaging device, the method comprising:
controlling, with one or more computing devices, an operation of an illumination device such that a light pattern is displayed on a field surface of the portion of the field within the field of view of the imaging device;
receiving, with the one or more computing devices, image data indicative of the displayed light pattern from the imaging device as the agricultural machine travels across the field;
determining, with the one or more computing devices, a distortion of the displayed light pattern based on the received image data; and
determining, with the one or more computing devices, at least one of a residue characteristic, a clod size, or a soil roughness of the field based on the determined distortion of the displayed light pattern.

12. The method of claim 11, wherein determining the the distortion of the displayed light pattern comprises:
comparing, with the one or more computing devices, the received image data to a reference image associated with the displayed light pattern; and
determining, with the one or more computing devices, the distortion of the displayed light pattern based on the comparison of the received image data and the reference image.

13. The method of claim 11, wherein determining the the distortion of the displayed light pattern comprises:
determining, with the one or more computing devices, a pattern parameter of the displayed light pattern;
determining, with the one or more computing devices, a differential between the determined pattern parameter and a predetermined pattern parameter value associated with the displayed light pattern; and
determining, with the one or more computing devices, the distortion of the displayed light pattern based on the determined differential.

14. The method of claim 13, wherein the light pattern comprises a plurality of lines and the pattern parameter comprises at least one of a thickness of a line of the of the plurality of lines or a distance between a pair of lines of the plurality of lines.

15. The method of claim 13, wherein the light pattern comprises a first line and a second line intersecting the first line, the pattern parameter comprising an angle defined between the first line and the second line.

16. The method of claim 11, wherein the light pattern comprises a plurality of lines arranged in a grid.

17. The method of claim 11, further comprising:
controlling, with the one or more computing devices, the operation of the illumination device to adjust an intensity of a tight emitted by the illumination device based on an environmental characteristic of the field.

18. The method of claim 11, further comprising:
adjusting, with the one or more computing devices, an operating parameter of the agricultural machine based on the determined at least one of the residue characteristic, the clod size, or the soil roughness.

19. The method of claim 11, wherein determining the at least one of the residue characteristic, the clod size, or the soil roughness of the field comprises determining, with the one or more computing devices, the residue characteristic of the field based on the distortion of the displayed light pattern.

* * * * *